(12) United States Patent
Steinbusch et al.

(10) Patent No.: US 9,098,272 B2
(45) Date of Patent: Aug. 4, 2015

(54) POWER MANAGEMENT USING AUTOMATIC LOAD/UNLOAD DETECTION OF DAC

(75) Inventors: Otto Steinbusch, Mountain View, CA (US); Zahid Najam, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1150 days.

(21) Appl. No.: 12/002,166

(22) Filed: Dec. 14, 2007

(65) Prior Publication Data

US 2009/0158066 A1 Jun. 18, 2009

(51) Int. Cl.
*G06F 3/038* (2013.01)
*G06F 1/26* (2006.01)
*G06F 1/32* (2006.01)

(52) U.S. Cl.
CPC ............ *G06F 1/3203* (2013.01); *G06F 1/3287* (2013.01); *Y02B 60/1282* (2013.01); *Y02B 60/32* (2013.01)

(58) Field of Classification Search
USPC .......... 713/300, 310, 322–324, 601; 345/204, 345/698
See application file for complete search history.

(56) References Cited

U.S. PATENT DOCUMENTS

| | | | | | |
|---|---|---|---|---|---|
| 4,631,532 | A | * | 12/1986 | Grothe | 345/22 |
| 5,282,034 | A | * | 1/1994 | Elkind et al. | 348/180 |
| 5,475,402 | A | * | 12/1995 | Hijikata | 345/211 |
| 5,537,650 | A | * | 7/1996 | West et al. | 713/324 |
| 5,615,376 | A | * | 3/1997 | Ranganathan | 713/322 |
| 5,644,325 | A | * | 7/1997 | King et al. | 345/20 |
| 6,411,330 | B1 | * | 6/2002 | Purcell et al. | 348/180 |
| 6,940,440 | B1 | * | 9/2005 | Iacob | 341/144 |
| 2009/0224866 | A1 | * | 9/2009 | Glen et al. | 340/3.43 |

OTHER PUBLICATIONS

Definition of "Blanking" from Wikipedia, <http://en.wikipedia.org/wiki/Blanking_(video)>, accessed on Aug. 12, 2010.*

* cited by examiner

*Primary Examiner* — Khanh Dang

(57) ABSTRACT

An automatic load detection system. A first reference signal that may be known apriori can be used for load detection. For example, the first reference signal may be used for invisible portion of a frame. The DAC receives the first reference signal and outputs a signal that is based on the first reference signal. The output of the DAC may have two known values depending on whether the load is coupled to the DAC, e.g., by having a different impedance. Thus, the output signal may be used for detecting whether the load is uncoupled from the DAC. If it is determined that the load is uncoupled from the DAC, the clocking signal to the DAC may be turned off. Thus, DAC no longer consumes power when the load is uncoupled, thereby saving power.

21 Claims, 4 Drawing Sheets

POWER MANAGEMENT USING AUTOMATIC LOAD/UNLOAD DETECTION OF DAC

TECHNICAL FIELD

The embodiments of the present invention relate to the field of power management in electronic devices.

BACKGROUND ART

Use of various electronic devices has increased substantially in recent years. For example, use of laptops, mobile telephones, Blackberrys, pagers, IPods, IPhone, etc. have become common in public places such as coffee shops, restaurants, college campuses, businesses, etc.

In general, most electronic devices are capable of rendering graphical content. Accordingly, most electronic devices are equipped with chips that display graphical content, e.g., graphical processing unit (GPU), application processor chips, etc. GPUs, application processor chips, etc. generally employ at least one digital to analog converter (DAC) to drive pixel data to a load, e.g., video receiver, television, display, etc. For example, a DAC in a camcorder may be used to drive the signal to a television set.

Referring now to FIG. 1, a conventional DAC 110 coupled to a receiver 120 is shown. DAC 110 may be a DAC that belongs to a handheld electronic device, e.g., a camcorder. It is appreciated that the receiver may be any load that may be coupled to the DAC 110. For example, the receiver 120 may be a television set, a display, etc. Various standards may be employed by DACs. For example, one standard is a composite standard that uses one DAC coupled to the receiver 120. Another standard is an S-video standard that uses two DACs coupled to the receiver 120. Finally, a VGA standard may be used that uses three DACs coupled to the receiver 120.

Unfortunately, DACs consume a considerable amount of power. As a result, in order to conserve power, it is desirable to turn off the clock to the DAC 110 when the DAC 110 is not coupled to the load, e.g., receiver 120.

Unfortunately, detection of load disconnection, e.g., receiver 120, is complicated to automate because the DAC 110 is generally controlled by the content, e.g., video content. Since load detection is manual, without user interaction the DAC keeps operating and consuming power even after it is disconnected from the load. For example, a DAC within a camcorder continues its operation and consumption of power even after it is disconnected from a television set. As a result, the manual process is not only tedious by requiring user interaction but it is power inefficient because without manual intervention by the user the DAC keep consuming power even though the load may no longer be connected.

SUMMARY

Accordingly, a need has arisen for improving power efficiency of electronic devices that use DACs by automatically detecting load disconnection. As such, when load disconnection is detected, the clock to the DAC may be turned off to save power. It will become apparent to those skilled in the art after reading the detailed description of the present invention that the embodiments of the present invention satisfy the above mentioned needs.

In one embodiment of the present invention, a first reference signal that may be known apriori can be used for load detection. For example, the first reference signal may be used for an invisible portion of a frame. The DAC receives the first reference signal and outputs a signal that is based on the first reference signal. The output of the DAC may have two known values depending on whether the load is coupled to the DAC, e.g., one value when the load is coupled and another value when the load is not coupled to the DAC. Thus, the output signal may be used for detecting whether the load is uncoupled from the DAC.

As a result, when the output of the DAC is compared to a known second reference signal, e.g., voltage value when the load is coupled and/or value when the load is uncoupled, it can be determined whether the load, e.g., receiver, television, display, etc. is coupled to the DAC. If it is determined that the load is uncoupled from the DAC, the clocking signal to the DAC may be turned off. Thus, the DAC no longer consumes power when the load is uncoupled, thereby saving power.

More specifically, an embodiment of the present invention pertains to a system for automatic load detection. The system includes a display controller generating a control signal. A selector may be used to select pixel data or a first reference signal, wherein the selection is responsive to the control signal.

The system may further include the DAC that receives a selection by the selector and outputs a signal, wherein the output signal has a first detectable value when the first reference signal is selected and the load is coupled to the DAC, and wherein the output signal has a second detectable value when the first reference signal is selected and the load is uncoupled from the DAC. The DAC is operable to convert the pixel data to analog signal, wherein the analog signal is operable to be displayed on a display. According to one embodiment, the value of the output signal changes between the first detectable value and the second detectable value due to a change in impedance when the load is uncoupled from the DAC.

The system may further include a comparator that compares the output signal to a second reference signal and outputting a comparison signal, wherein the comparison signal has a third value when the output signal has the first detectable value, and wherein the comparison signal has a fourth value when the output signal has the second detectable value. The system further includes a deactivating component operable to turn off a clock to the DAC when the comparison signal has said fourth value.

The embodiments include the above and wherein, the control signal is the line number for a pixel line being processed. The selector may be a multiplexer.

According to one embodiment, the selector selects the first reference signal when the control signal corresponds to the line number for a pixel line that is not visible. The selector may select the first reference signal when the control signal corresponds to the not visible portion of the line number for a pixel line that includes visible and not visible portions. The deactivating component may be selected from a group consisting of a status register and a state machine.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Improved Power Management Using Automatic Load/Unload Detection of DAC

Figure 1:
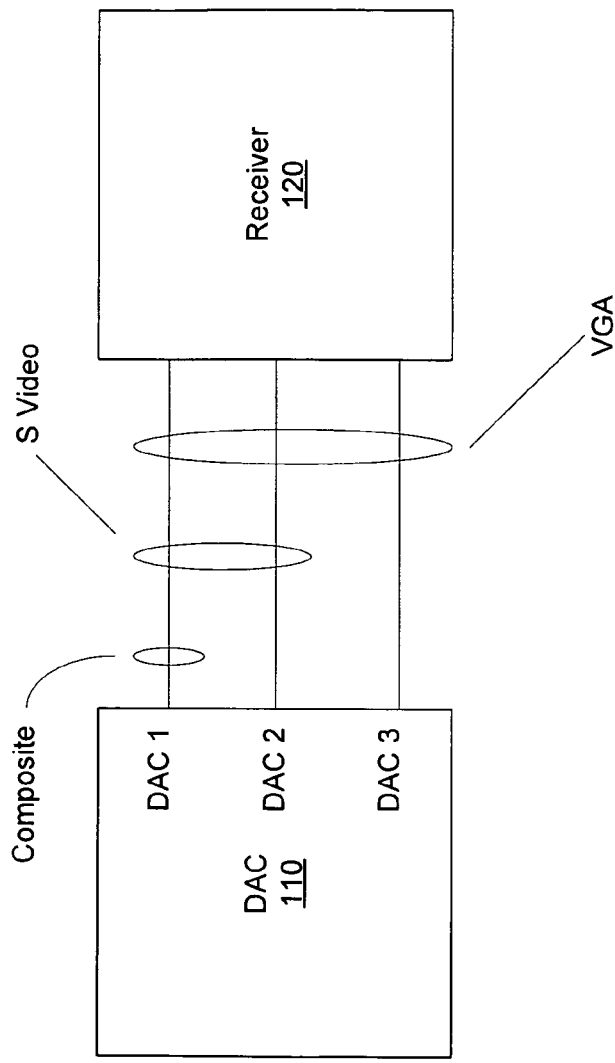
FIG. 1 shows a prior art system using a DAC.
Figure 2:
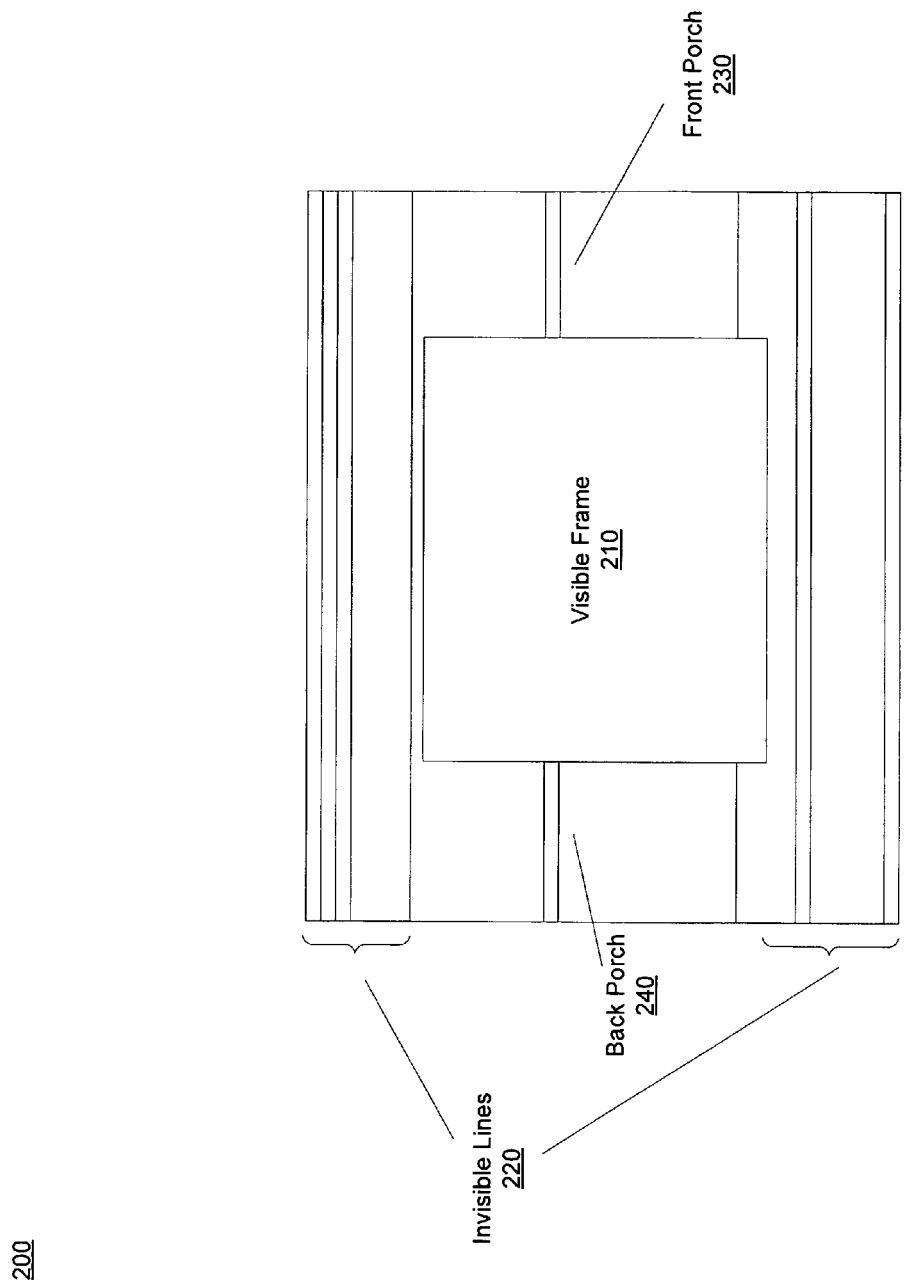
FIG. 2 shows an exemplary renderable frame in accordance with one embodiment of the present invention.

Referring now to FIG. 2, an exemplary renderable frame 200 in accordance with one embodiment of the present invention is shown. In general, renderable frames contain various lines that may include visible and invisible portions. The visible portion refers to a portion of the frame that is visible to the end-user. The invisible portion on the other hand refers to a portion of the frame that is invisible to the end-user.

The renderable frame 200 comprises a visible frame portion 210. Moreover, the renderable frame 200 includes lines that are invisible to the user. For example, renderable frame 200 includes invisible lines 220 on the top and the bottom of the frame 200. For example, in NTSC analog television system lines 19 and 20 may be invisible to the user, but it is not limited thereto.

It is appreciated that some lines within the frame 200 may include both visible and invisible portions. For example, on the same line that the visible frame 210 is rendered, invisible lines may be present, e.g., back porch 240 and front porch 230. In general, front porch 230 refers to invisible lines to the right of the visible frame 210 portion and the back porch 240 refers to invisible lines to the left of the visible frame portion 210.

It is appreciated that the location of invisible lines 220, visible frame 210, invisible front porch 230 and invisible back porch 240 are exemplary and are not intended to limit the scope of the present invention. For example, the frame 200 may comprise only invisible front porch 230 portion and the visible frame 210 portion, without having the top and the bottom invisible lines 220 and without having the invisible back porch 240 portion. As such, the location of visible lines and invisible lines or portions of visible and/or invisible lines within a frame is not intended to limit the scope of the present invention.

As presented and discussed above, load detection e.g., load disconnection, is complicated to automate because the DAC is controlled by the video content. Moreover, the DAC cannot be driven by a user-defined input during the active area of the video display, e.g., visible portion of the display, since it is visible to the user. Thus, the invisible portion of the frame, e.g., invisible lines 220, front porch 230 and/or back porch 240, etc., may be used for load detection.

Figure 3:
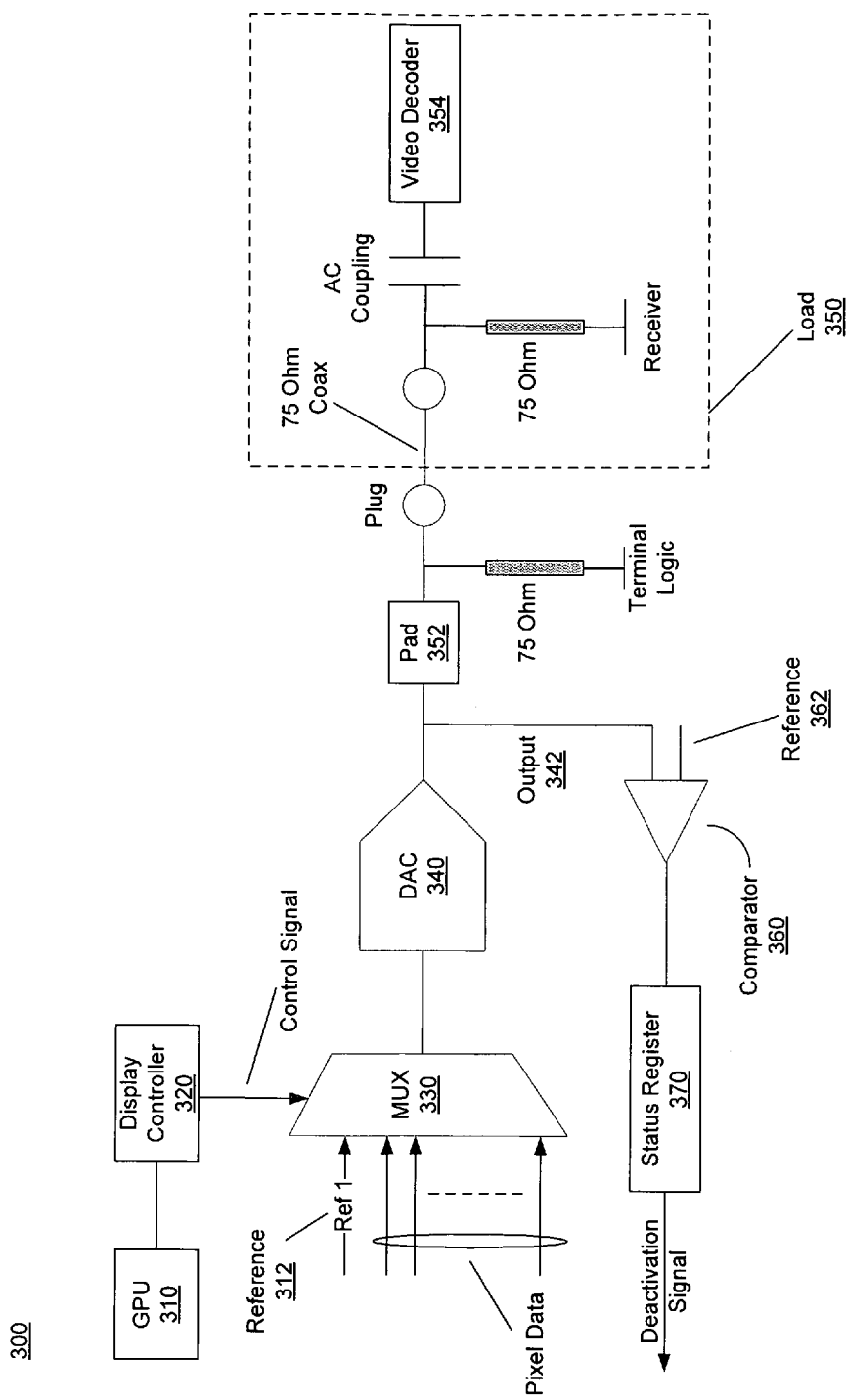
FIG. 3 shows an exemplary system for automatic load detection in accordance with one embodiment of the present invention.

Referring now to FIG. 3, an exemplary system 300 for automatic load detection in accordance with one embodiment of the present invention is shown. In one embodiment, the exemplary system 300 comprises a graphical processing unit (GPU) 310, a display controller 320, a selector such as a multiplexer 330, a DAC 340, a load 350, a comparator 360 and a status register 370.

In one embodiment of the present invention, a first reference signal 312 that may be known apriori can be used for load detection. For example, the first reference signal 312 may be used for invisible portion of a frame, e.g., pixels for invisible lines 220, front porch 230, back porch 240, or any combination thereof. The DAC 340 receives the first reference signal 312 and outputs a signal 342 that is based on the first reference signal 312. The output of the DAC 340 may have two known values depending on whether the load 350 is coupled to the DAC 340, e.g., one value when the load 350 is coupled and another value when the load 350 is not coupled to the DAC 340. Thus, the output signal 342 may be used for detecting whether the load 350 is uncoupled from the DAC 340.

As a result, when the output of the DAC 340 is compared to a known second reference signal 362, e.g., voltage value when the load is coupled and/or value when the load is uncoupled, it can be determined whether the load 350, e.g., receiver, television, display, etc. is coupled to the DAC 340. If it is determined that the load 350 is uncoupled from the DAC 340, the clocking signal to the DAC 340 may be turned off. Thus, DAC 340 no longer consumes power when the load 350 is uncoupled, thereby saving power. The operation of the system 300 is described in more detail below.

The GPU 310 is operable to process graphical information and produce pixel data operable for rendering on a display, e.g., television, display, etc. The GPU 310 may be coupled to the display controller 320. It is appreciated that the GPU 310 may be integrated within a central processing unit (CPU) or it may be separate from the CPU.

In one embodiment, the display controller 320 generates a control signal. In one example, the control signal is the line number for the frame, e.g., line 19 of the frame. As a result, in one exemplary embodiment the display controller 320 may include a counter (not shown) for counting the lines and updating the line number for the line being processed. In one embodiment, the control signal may correspond to raster information for a pixel being processed. The raster information may include coordinates of the pixel. The control signal is sent to the multiplexer 330.

The multiplexer 330 receives various input signals along with the control signal from the display controller 320. Input signals include a first reference signal 312 and pixel data. The first reference signal 312 may be a known signal, e.g., having a known digital value. The pixel data is data that is to be rendered by the load 350, e.g., a display, a television set, receiver, etc.

As discussed above, the invisible portion of the frame, e.g., invisible lines 220, front porch 230 and/or back porch 240, any combination thereof, etc., may be used for load detection. Thus, the multiplexer 330 is designed to select the first reference signal 312 when the raster information corresponds to invisible portion of the frame that is being processed and to select the pixel data when the visible portion, e.g., visible frame 210, of the frame is being processed.

If the invisible portion, e.g., pixels in the back porch 240, front porch 230, invisible lines 220, etc., are being processed, the multiplexer 330 selects the first reference signal 312 based on the control signal received from the display controller 320. The first reference signal 312 is sent to the DAC 340. The DAC 340 may or may not change the value of the received first reference signal 312. The DAC 340 may then output signal 342.

In one embodiment, when the load 350 is coupled to the DAC 340, the output 342 signal has a first detectable value. In comparison, when the load 350 is uncoupled from the DAC 340, the output 342 signal has a second detectable value. The first and the second detectable values are based on the impedance of the load 350 when coupled to the DAC 340 and when uncoupled from the DAC 340. For example, the first detectable value may be a detectable voltage when the load 350 is coupled to the DAC 340 and the second detectable value may be a detectable voltage when the load 350 is uncoupled from the DAC 340. It is appreciated that the detectable values are not limited to voltage values. Thus, detectable values based on a detectable voltage is exemplary and should not be construed as limiting the scope of the present invention. For example, a detectable current may be used instead but it is not limited thereto.

Apriori knowledge of the first detectable value and the second detectable value may be used to determine whether the load 350 is coupled or uncoupled from the DAC 340. For example, the comparator 360 may be used to compare the output 342 signal with the reference 362 signal. In one example, the reference 362 signal may have a value equal to the first detectable value. Thus, when the reference 362 signal and the output 342 signal have the same value, it is determined that the load 350 is coupled to the DAC 340. Similarly, when the reference signal 362 and the output 342 signal have different values, e.g., the output 342 signal has a second detectable value, it is determined that the load 350 is uncoupled from the DAC 340.

It is appreciated that the value of the reference signal 362 may be changed to any known value depending on the design requirement. For example, the reference 362 signal may have a value equal to the second detectable value. As a result, when the reference 362 signal and the output 342 signal are compared and have the same value, it is determined that the load 350 is uncoupled from the DAC 340. Similarly, when the reference 362 signal and the output 342 signal are compared and have different values, e.g., the output signal 342 has a first detectable value, it is determined that the load 350 is coupled to the DAC 340.

It is further appreciated that the reference signal 362 may be chosen to have a value different than that of the first detectable and the second detectable value. For example, the reference signal 362 may be any value and comparing the reference signal 362 may result in an offset value that can be accordingly used to determine whether the load 350 is coupled to the DAC 340 in a similar manner. Thus, the value of the reference signal 362 presented above are exemplary and are not intended to limit the scope of the present invention.

The comparator 360 outputs a comparison signal that as discussed above indicates whether the load 350 is coupled to the DAC 340 or uncoupled from the DAC 340. When the comparison signal determines that the load 350 is uncoupled from the DAC 340, the status register 370 may generate a deactivation signal based on a programmable instruction. The deactivation signal may disable/deactivate the sending of the clock signal to the DAC 340 and/or turn off the clock signal to the DAC 340. As a result, the DAC 340 no longer consumes power when the load 350 is uncoupled from the DAC 340. It is appreciated that a state machine (not shown) or other similar components may be used instead of the status register 370 or in conjunction with the status register 370 to turn off the clock and/or deactivate/disable the sending of the clock signal to the DAC 340.

It is appreciated that in one embodiment, to save power, the DAC logic may be turned off in addition and/or instead of turning off the clocking signal. Moreover, it is appreciated that in one embodiment in order to save power, the power is cut to the power rail that is associated with a particular logic partition of the DAC 340.

In contrast, when the visible portion, e.g., visible frame 210, is being processed, the multiplexer 330 selects the pixel data based on the control signal received from the display controller 320. The pixel data is then sent to the DAC 340. The DAC 340 converts the pixel data from a digital format into analog signal operable for rendering by the load 350, e.g., television set, display, receiver, etc. It is appreciated that the output of the DAC 340 may be similarly processed by the comparator 360, as discussed above.

It is appreciated that, the load 350 may comprise various components. In one exemplary embodiment, the load 350 may be coupled to the DAC 340 via a pad 352, a plug and a 75 ohm impedance that is used as a terminal logic. The load may comprise a video decoder 354, a 75 ohm coax cable and an alternative current (AC) coupling. It is further appreciated that 75 ohm impedance may be used by the receiver in order to have a proper matching with the 75 ohm coax cable. 75 ohm coax cable and 75 ohm impedance matching is exemplary and should not be construed as limiting the scope of the present invention. For example, a 50 ohm impedance may be used instead. Since the impedance of the load 350 effects the first and the second detectable values for the output signal 342, the reference signal 362 may be chosen by considering the known impedance of the load 350.

Figure 4:
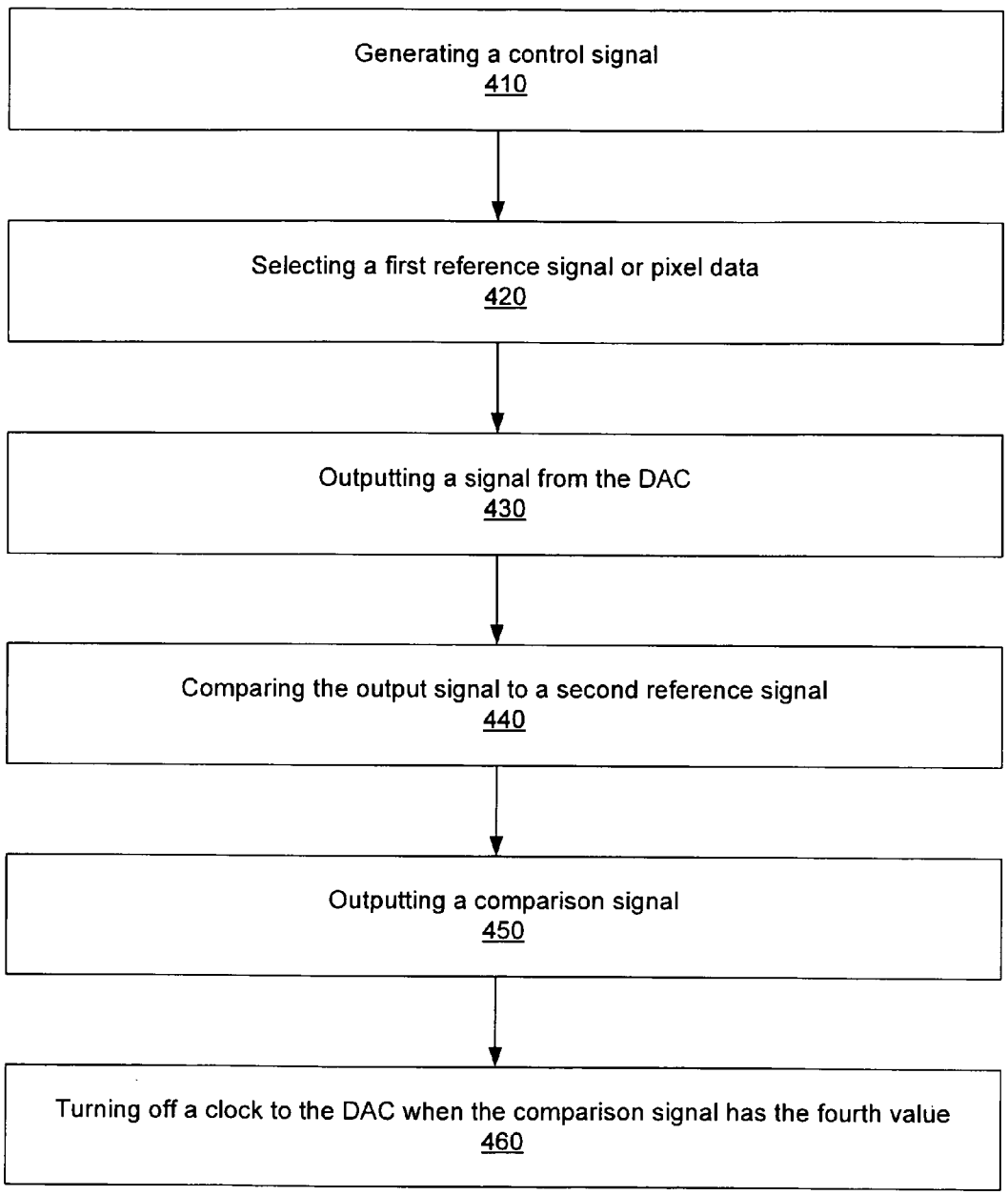
FIG. 4 shows an exemplary flow diagram for automatic load detection in accordance with one embodiment of the present invention.

Referring now to FIG. 4, an exemplary flow diagram 400 for automatic load detection in accordance with one embodiment of the present invention is shown. At step 410, a control signal is generated by the display controller 320. The display controller 320 may generate the control signal based on the signal received from the GPU 310. In one example, the control signal may be the line number for the pixel line within the frame that is being processed, e.g., line 19 of an NTSC television frame. In one embodiment, the control signal may correspond to raster information for a pixel being processed. The raster information may include coordinates of the pixel.

At step 420, in response to the control signal received, the multiplexer 330 may select a first reference signal 312 or pixel data. In one example, the pixel data are processed digital data operable for rendering. The first reference signal 312 on the other hand may be a signal that may be known apriori, e.g., a known digital value that may be a voltage value.

It is appreciated that the first reference signal 312 may be selected when the control signal corresponds to the raster information for a pixel that is not visible. For example, the first reference signal 312 may be selected when the control signal corresponds to the invisible lines 220. The first signal may also be selected when the control signal corresponds to the invisible portion of the pixel line that comprises visible and invisible portions, e.g., front porch 230 and/or back porch 240, to name a few.

The selected signal may be sent to the DAC 340. If the selected signal is pixel data, the DAC 340 converts pixel data from digital to analog format that is operable for rendering by the load, e.g., television set, display, etc. If the selected signal is the first reference signal 312, the DAC 340 may or may not change its value. At step 430, the DAC 340 outputs the resultant signal.

At step 440, the output signal from the DAC 340 may be compared to a second reference signal 362. When the multiplexer 330 selects the first reference signal 312, the output of the DAC 340 may be a first detectable value or a second detectable value based on whether the load 350 is coupled to the DAC 340. In other words, the impedance of the load 350 affects the detectable value of the output from the DAC 340.

It is appreciated that the second reference signal 362 may be any value. For example, the second reference signal 362 may be a value corresponding to when the load 350 is coupled to the DAC 340. Similarly, the second reference signal 362 may be a value when the load 350 is not coupled to the DAC 340. As a result, the comparator 360 may determine whether the load 350 is coupled to the DAC 340 or whether the load 350 is uncoupled from the DAC 340. It is appreciated that the value of the second reference signal 362 discussed above is exemplary and should not be construed as limiting the scope of the present invention.

At step 450, the comparator 360 outputs a comparison signal which is the result of the comparison. Accordingly, the comparison signal having a third value may indicate that the load 350 is coupled to the DAC 340 and a fourth value may indicate that the load 350 is uncoupled from the DAC 340.

At step 460, when the comparison signal determines that the load 350 is uncoupled from the DAC 340, a signal may be generated, e.g., deactivation/disabling signal, to turn off the clock to the DAC 340. Turning off the clock to the DAC 340 may be performed by a state machine and/or a status register, as discussed above.

As a result, load detection is automatically determined. Thus, it is automatically determined whether the load 350 is coupled to the DAC 340. Accordingly, when the load 350 is not coupled to the DAC 340, the DAC 340 can be turned off to prevent wasting power. Turning off the DAC 340 may be via turning off the clock or disabling the clock to the DAC 340 or by other means discussed above. Thus, the power consumption of the DAC 340 is reduced when the load 350 is not coupled to the DAC 340, thereby saving power when not in use.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An automatic load detection system comprising:
a display controller generating a control signal;
a selector operable to select pixel data or a first reference signal, wherein said selection is responsive to said control signal, and wherein said selector is coupled to said display controller, wherein said first reference signal is operable for load detection, wherein said control signal is raster information for a pixel being processed, wherein said raster information provides coordinates of said pixel and wherein said first reference signal is selected when said control signal corresponds to an non-displayed portion of a digital video frame;
a digital to analog converter (DAC) operable to receive a selection by said selector and outputs an output signal, wherein said DAC is coupled to said selector, and wherein said output signal has a first detectable value when said first reference signal is selected and a load is coupled to said DAC, and wherein said output signal has a second detectable value when said first reference signal is selected and said load is uncoupled from said DAC; and
a comparator operable to compare said output signal to a second reference signal and outputting a comparison signal, wherein said comparator is coupled to said DAC, and wherein said comparison signal has a third value when said output signal has said first detectable value, and wherein said comparison signal has a fourth value when said output signal has said second detectable value, and wherein said fourth value indicates that said load is uncoupled from said DAC.

2. The system as described in claim 1 further comprising:
a deactivating component operable to reduce power consumption of said DAC at least by turning off a clock to said DAC when said comparison signal has said fourth value or by gating said clock to a logic of said DAC.

3. The system as described in claim 2, wherein said deactivating component is selected from a group consisting of a status register and a state machine.

4. The system as described in claim 1, wherein said selector is a multiplexer.

5. The system as described in claim 1, wherein said selector is operable to select said first reference signal when said control signal corresponds to raster information for a pixel being processed, and wherein said raster information provides coordinates of said pixel, and wherein said pixel is not visible.

6. The system as described in claim 5, wherein said selector selects said first reference signal.

7. The system as described in claim 1, wherein said DAC is operable to convert said pixel data to analog signal, wherein said analog signal is operable to be displayed on a display.

8. The system as described in claim 1, wherein the value of said output signal changes between said first detectable value and said second detectable value due to a change in impedance when said load is uncoupled from said DAC.

9. A method for automatic load detection, said method comprising:
generating a control signal;
in response to said control signal, selecting a first reference signal or pixel data, wherein said first reference signal is operable for load detection, wherein said control signal is raster information for a pixel being processed, wherein said raster information provides coordinates of said pixel and wherein said first reference signal is selected when said control signal corresponds to a non-displayed portion of a digital video frame;
outputting a signal from said DAC, wherein said output signal has a first detectable value when said first reference signal is selected and said load is coupled to said DAC, and wherein said output signal has a second detectable value when said first reference signal is selected and said load is uncoupled from said DAC;
comparing said output signal to a second reference signal; and
outputting a comparison signal, wherein said comparison signal has a third value when said output signal has said first detectable value, and wherein said comparison signal has a fourth value when said output signal has said second detectable value, wherein said third value indicates that said load is coupled to said DAC, and wherein said fourth value indicates that said load is uncoupled from said DAC.

10. The method as described in claim 9 further comprising:
reducing power consumption of said DAC by at least turning off a clock to said DAC when said comparison signal has a fourth value or by gating said clock to a logic of said DAC.

11. The method as described in claim 10, wherein said reducing power consumption is by using a deactivating component selected from a group consisting of a status register and a state machine.

12. The method as described in claim 9, wherein said pixel is not visible.

13. The method as described in claim 12, wherein said selecting selects said first reference signal.

14. The method as described in claim 9, wherein said DAC is operable to convert said pixel data to analog signal, wherein said analog signal is operable to be displayed on a display.

15. The method as described in claim 9, wherein the value of said output signal changes between said first detectable value and said second detectable value due to a change in impedance when said load is uncoupled from said DAC.

16. A system for automatically disabling a digital to analog converter (DAC) when a load is uncoupled from said DAC, said system comprising:
a graphical processing unit (GPU);
a display controller coupled to said GPU, wherein said display controller generates a control signal;
a selector operable to select pixel data or a first reference signal, wherein said selection is responsive to said control signal, and wherein said first reference signal is operable for load detection, wherein said selector is operable to select said first reference signal when said control signal corresponds to raster information for a pixel being processed, wherein said raster information provides coordinates of said pixel, and wherein said pixel is not visible and wherein said first reference signal is selected when said control signal corresponds to a non-displayed portion of a digital video frame;
said DAC operable to receive a selection by said selector and outputs a signal, wherein said output signal has a first detectable value when said first reference signal is selected and said load is coupled to said DAC, and wherein said output signal has a second detectable value when said first reference signal is selected and said load is uncoupled from said DAC;
said load being selectively coupled to said DAC, wherein said load is operable to receive analog content from said DAC, and wherein said load is further operable to render said analog content;
a comparator operable to compare said output signal to a second reference signal and outputting a comparison signal, wherein said comparison signal has a third value when said output signal has said first detectable value, and wherein said comparison signal has a fourth value when said output signal has said second detectable value; and
a deactivating component operable to reduce power consumption of said DAC at least by turning off a clock to said DAC when said comparison signal has said fourth value or by gating said clock to a logic of said DAC.

17. The system as described in claim 16, wherein said selector is a multiplexer.

18. The system as described in claim 16, wherein the value of said output signal changes between said first detectable value and said second detectable value due to a change in impedance when said load is uncoupled from said DAC.

19. The system as described in claim 16, wherein said deactivating component is selected from a group consisting of a status register and a state machine.

20. The system as described in claim 16, wherein said DAC passes through said first reference signal.

21. The system as described in claim 18, wherein said first detectable value is a voltage value.

* * * * *